United States Patent [19]
Bemis

[11] 3,720,147
[45] March 13, 1973

[54] MASK FOR SURVEILLANCE CAMERA
[75] Inventor: Winfield W. Bemis, Maynard, Mass.
[73] Assignee: Setronics Corp., Maynard, Mass.
[22] Filed: April 29, 1971
[21] Appl. No.: 138,600

[52] U.S. Cl. ...................................... 95/86, 352/242
[51] Int. Cl. .............................................. G03b 17/56
[58] Field of Search .................. 95/86; 352/242, 243

[56] References Cited

UNITED STATES PATENTS

| | | | |
|---|---|---|---|
| 1,179,330 | 4/1916 | Leithold | 95/86 |
| 2,348,841 | 5/1944 | Oswald | 95/86 X |

FOREIGN PATENTS OR APPLICATIONS 212,168  11/1960  Austria.....................................95/86

Primary Examiner—John M. Horan
Assistant Examiner—E. M. Bero
Attorney—Kenway, Jenney & Hildreth

[57] ABSTRACT

A surveillance camera is mounted within and disguised by a hollow spherical mask. The mask and camera rotate about an axis to scan a field of view, and the camera is aimed through a transparent window in the mask. The inner surface of the mask in the line of vision through the window and the outer surface adjacent the window are darkened to minimize the visibility of the camera.

10 Claims, 3 Drawing Figures

PATENTED MAR 13 1973 3,720,147

INVENTOR
WINFIELD W. BEMIS

BY Kenway, Jenney &
Hildreth

ATTORNEYS

MASK FOR SURVEILLANCE CAMERA

BRIEF SUMMARY OF THE INVENTION

This invention relates generally to surveillance cameras such as those used in stores, transportation terminals, banks and other places where it is desired to observe the activities occurring within a particular field of view. More particularly, this invention is concerned with means for disguising the camera and particularly the direction of its optical axis, that is, the momentary location of the field of view.

Surveillance cameras take several forms including kinescopic (television) and photographic cameras with either fixed optical axes or optical axes having one or two degrees of rotational freedom.

In some cases it is desirable to disguise the presence of the camera completely, thus obscuring its optical axis or field of view. In other cases the bulk of the camera or its physical location for acceptable viewing make it difficult or impossible to obscure the fact that a surveillance camera is in use. There are some applications as in retail stores where it is considered advantageous to make it known that such cameras are in use. Even when the presence of a camera is readily noticed it may be desirable to camouflage the momentary direction of the optical axis or direction of viewing of the camera, whether this direction is held fixed or has one or two degrees of freedom of rotation. In this connection it is common to refer to rotation about a generally vertical axis as "scanning" and to rotation about a generally horizontal axis as "tilting."

The general configurations of the usual forms of camera housings and lenses are readily recognized even at a substantial distance. Thus for example, a shoplifter may be able to ascertain, at a glance toward an unmasked surveillance camera, whether it is likely that he is momentarily within its field of view.

It is a principal object of this invention to provide a mask that effectively disguises the direction of the optical axis of the camera, whether or not it may be apparent to an onlooker that a camera is in use.

A further object is to provide the foregoing feature not only when the optical axis is fixed but also when it is rotatable in any direction.

Further objects are to obscure the physical configuration of the camera, and in some cases to provide the secondary feature of an attractive decoration where the camera is installed in a conspicuous location. Other objects of the invention will become evident from the following description.

According to this invention, the foregoing objects are attained by means of a mask for the camera that comprises a hollow shell having a transparent window through which the optical axis of the camera is directed. The location of this window on the exterior surface of the shell is disguised by a treatment of the light reflective properties of surfaces of the shell including both interior and exterior surfaces thereof visible by an onlooker looking into the window and at the exterior surfaces in the region adjacent to the window.

DETAILED DESCRIPTION

Figure 1:
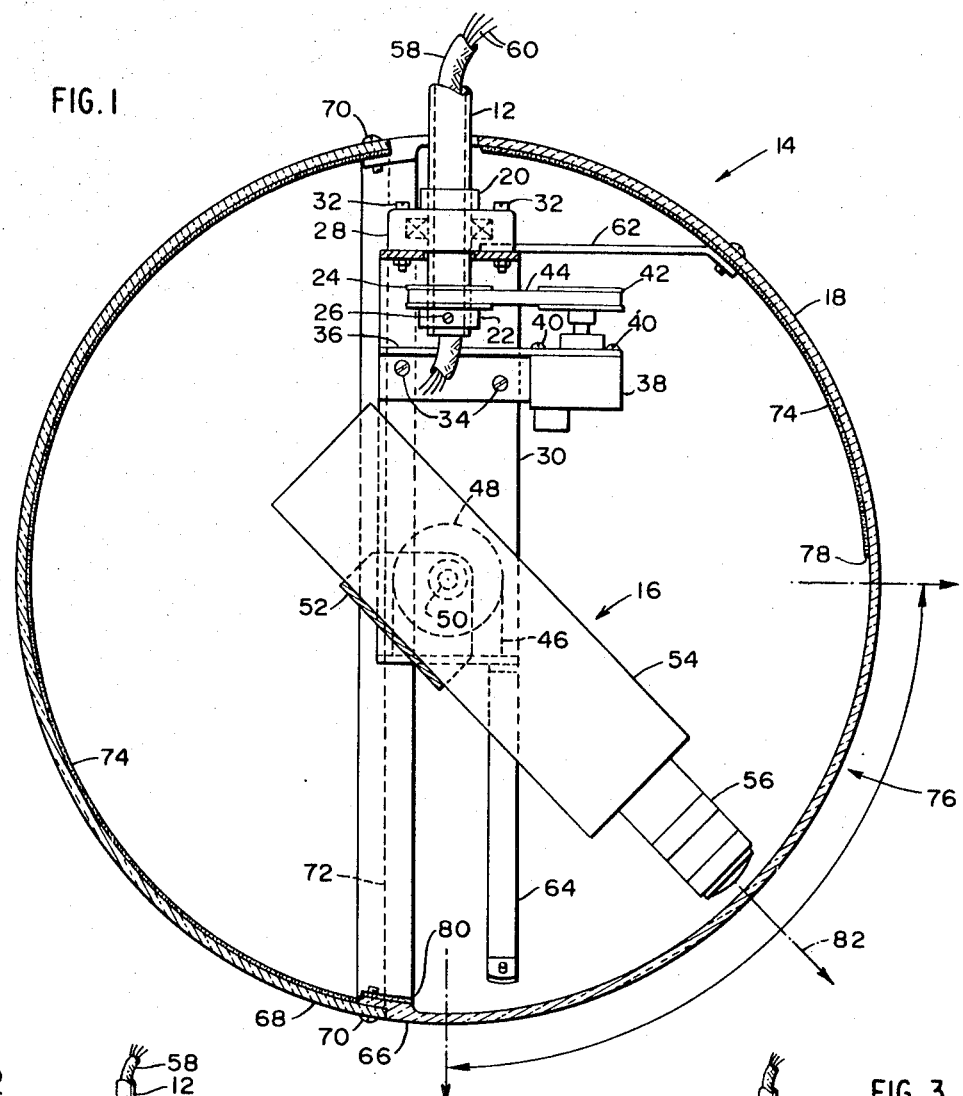
FIG. 1 is an elevation in section of a preferred embodiment of the invention.

Referring to FIG. 1, a pipe or conduit 12 shown broken away at its upper end, is fastened in fixed position in the ceiling of a room, for example a retail store. A masked surveillance device shown generally at 14 is mounted on the pipe. The device 14 has provision for mounting a television or photographic camera designated generally at 16 and also a hollow shell 18 that substantially completely surrounds the camera.

The means for supporting the shell and camera are described as follows. A pair of collars 20 and 22 and a belt pulley 24 are secured to the pipe 12 by set screws such as 26. A ball bearing 28 is received on the pipe 12 and has its inner bearing race keyed or secured to the pipe by a force fit, keyway, set screw or other suitable means. The outer bearing race is secured to a depending sheet metal bracket 30 by screws 32.

The bracket 30 is secured by screws 34 to a sheet metal scan motor support bracket 36 having a scan motor 38 secured thereto by screws 40. The shaft of the motor 38 is secured to a belt pulley 42 aligned with the pulley 24, with an endless drive belt 44 passing around the two pulleys. It will be apparent that since the pulley 24 is keyed to the pipe 12, rotation of the scan motor shaft will cause the bracket 30 to rotate about the axis of the pipe 12.

The lower end of the bracket 30 is secured to a tilt motor support bracket 46 supporting a tilt motor 48. The motor 48 has a shaft 50 to which a camera mounting bracket 52 is secured so that the bracket 52 rotates with the shaft 50. The camera 16 has a body portion 54 secured to the mounting bracket 52, and a lens assembly 56 mounted in a wall of the body 54.

In the illustrated embodiment the camera 16 is a closed circuit television camera. An electrical cable 58 containing a plurality of wires 60 passes down from the ceiling through the pipe 12 to the interior of the shell 18. This cable is shown broken away at its lower end, but it will be understood that in practice the cable has a connection to the body 54 of the camera with a loop or bight between the lower end of the pipe and the camera body to accommodate the tilting and rotating movements of the latter, described below.

The shell 18 is secured to the bracket 30 by any suitable means, illustrated in the drawing by rigid metal straps 62 and 64 each fastened at one end to the bracket 30 and at the other end to the shell 18.

For convenience of fabrication and access, the shell 18 preferably comprises plural parts 66 and 68 fastened together by screws 70. In the illustrated case, the parts 66 and 68 are substantially complementary spherical segments joined at a seam 72 that lies in a plane offset from and parallel to the axis of the pipe 12, this axis lying within a vertical diametral plane through the sphere.

The shell parts 66 and 68 are preferably fabricated by molding transparent plastic sheet material of any suitable composition such as Plexiglas. Integral tabs, flanges, rabbets and the like may be provided to permit the parts to be assembled together with a close-fitting flush seam.

The interior surfaces of the parts 66 and 68 are completely coated with an opaque, black or dark colored paint or coating 74, except for an elongate window 76 defined in FIG. 1 by reference numerals 78 and 80 respectively defining the upper and lower limits of the aperture of the window. The window extends over an elongated segment of the sphere surface, the segment having its principal dimension in a substantially vertical plane and subtending an angle of slightly more than 90°.

By inspection of the figure, it will be seen that the above-mentioned offset in the seam 72 and the aperture extremities 78 and 80 are so located as to permit the camera to be rotated so that its optical axis 82 is either vertical, horizontal, or at any intermediate angle.

Operation of the scan motor 38 and tilt motor 48 can be accomplished in any desired manner, and the motors may be operated either in mutual synchronism or non-synchronously, that is, independently of one another. Also, the motors may be operated either on an automatic sequence, or by remote control by means of connections through some of the wires 60 in the cable 58. Further, either one or both of the motors may be stopped or omitted from the assembly entirely, if desired. As this invention is not concerned with the particular controls for the motors, these are not further described in detail herein.

For operation in retail stores, preferably the motors 38 and 48 are operated simultaneously so that the optical axis 82 is rotating about both horizontal and vertical axes to cover a large field of observation. The tilting movements consist of oscillations between the horizontal and vertical positions of the optical axis 82. The scanning movements are also preferably reciprocal through a substantial angle. This angle may be acute, obtuse, or any angle less than or greater than a full circle or a plurality of full circles, although in the latter case it is necessary to provide additional flexibility for the connection of the cable 58 to the camera body 54.

Preferably, the parts of the surveillance device within the shell 18, as viewed through the window 76, are also coated with an opaque, black paint or similar dark coating, the same as the coating 74. Light passing through the window will therefore be absorbed by all surfaces upon which it impinges, thereby minimizing the visibility of the camera 16.

Figure 2:
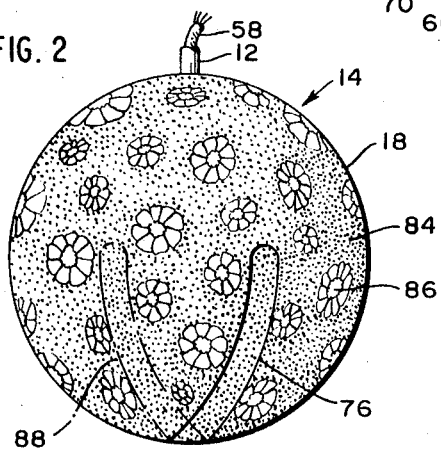
FIG. 2 is a view in elevation showing a first exterior surface pattern suitable for the mask.
Figure 3:
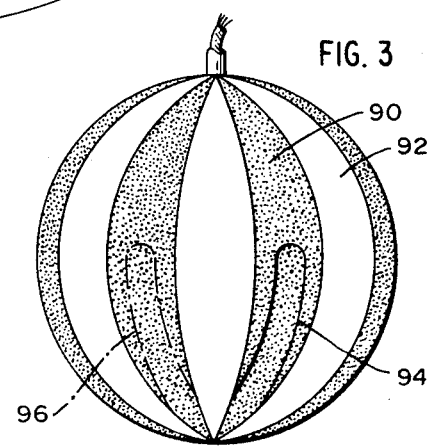
FIG. 3 is a view in elevation similar to FIG. 2 showing an alternative surface pattern.

The outline of the window 76, and therefore its location, is also disguised by the treatment of the exterior appearance of the shell 18 as shown in FIGS. 2 and 3. In FIG. 2 there is shown a printed or stenciled surface decoration comprising a black field 84 upon which there is an array of flowers 86 of various bright colors. The flowers are so distributed upon the surface of the shell 18 that there are a plurality of areas of the black field in which the window would fit. In other words, there are a number of areas of the black field sufficiently large to contain an outline congruent with that of the window. Thus a broken outline 88 in the drawing shows one such area located in displaced relationship to the window 76, the area 88 also being entirely black in appearance. As the shell 18 rotates around the pipe 12 in use, it is very difficult for an onlooker to determine the location of the window 76 on the shell.

It will be understood that the black or darkened appearance of the area around the outline of the window can be produced either by coating the exterior surface or by coating the interior surface if the sphere is made of a transparent material.

FIG. 3 represents another type of exterior surface decoration that provides a similar result. Here, the decoration comprises an alternating sequence of black and white or colored segments 90 and 92, respectively. A window 94 similar to the window 76 of FIGS. 1 and 2 is located in one of the black segments 90. A broken outline at 96 designates another black segment on the sphere wherein the window 94 could have been located by appropriately mounting the camera 16. Thus an onlooker cannot readily tell which of the black segments on the shell contains the window 94, there being as many possibilities as there are black segments on the sphere.

The foregoing features can also be realized by a shell which has an entirely black or dark colored exterior appearance, by coating either the entire exterior surface, or by coating the entire interior surface if the material of the shell is transparent.

It will be apparent that the advantages of this invention may be realized with the use of shells of other than a spherical shape, if desired. In the case of shells that are supported with or without rotation about a vertical axis as illustrated, it is useful to provide an exterior surface contour that has the same peripheral outline when viewed from a given viewing position at all angular positions of the shell. Thus the shell may have a surface contour generated by revolving a plane figure other than a circle about an axis coincident with that of the pipe 12, if desired. It is also apparent that for economy of space, it is desirable that such a figure should be convex in the region of the window 76, as in the case of the illustrated sphere.

In some cases, the exterior of the shell may also have a texture in, or protrusions from, its exterior surface consistently with the requirements of this invention. Thus for example, instead of the flowers 86 in FIG. 2 there may be a plurality of simulated lenses or other objects projecting in several directions.

It will be apparent that other modifications in the surveillance device may be accomplished by one skilled in this art, once the principles of this invention are understood.

I claim

1. A mask for a surveillance camera comprising
a substantially opaque hollow shell,
a transparent window in said shell, and
the interior portion of said shell visible through said window being of dark color.

2. A mask according to claim 1, in which said shell and said interior portions are absorptive to substantially all visible wavelengths of light.

3. A mask according to claim 2 in which the shell has an exterior surface contour generated by revolving a plane figure about an axis passing through the shell.

4. A mask according to claim 2 in which said window is elongate and the exterior portion of said shell adjacent said window is convex.

5. A mask according to claim 1, having a coating with a varicolored pattern on its exterior side.

6. A masked surveillance device having in combination,
a camera having an optical axis, a support means for the camera adapted for directing the optical axis toward a field of view, means for mounting said support means for rotation about a first axis, scan means to rotate the support means about said first axis to cause the camera to scan said field of view, and a hollow shell secured to said means for mounting said support means, enclosing the camera, having a first portion opaque except for a transparent window therein, said window being aligned with said optical axis, and having a second portion comprising that portion having an interior side visible through the window, said interior side being of dark color and substantially opaque.

7. A masked surveillance device according to claim 6, in which said portions are absorptive to substantially all visible wavelengths of light.

8. A masked surveillance device according to claim 6, in which the shell has a coating with a varicolored pattern on its exterior side.

9. A masked surveillance device according to claim 6, wherein said means for mounting said support means includes means for providing independent rotation thereof about both said first axis and about a second axis forming an angle with said first axis.

10. A masked surveillance device according to claim 9, in which the window is elongated.

* * * * *